Figure 1:
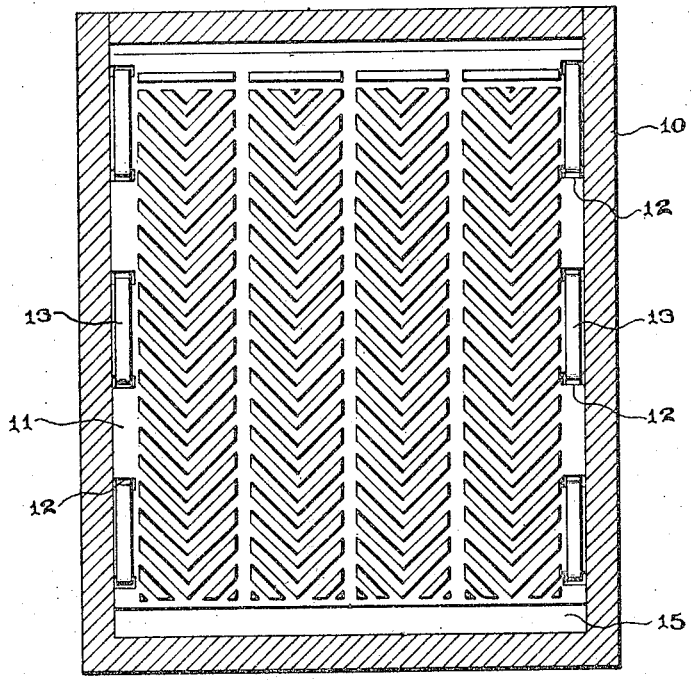

June 3, 1924.

W. W. MOORE

DRY STORAGE BATTERY

Filed Jan. 19, 1923

1,496,725

William W. Moore
INVENTOR

BY Victor J. Evans
ATTORNEY

WITNESS:

Patented June 3, 1924.

1,496,725

UNITED STATES PATENT OFFICE.

WILLIAM W. MOORE, OF SAN ANTONIO, TEXAS.

DRY STORAGE BATTERY.

Application filed January 19, 1923. Serial No. 613,726.

*To all whom it may concern:*

Be it known that I, WILLIAM W. MOORE, a citizen of the United States, residing at San Antonio, in the county of Bexar and State of Texas, have invented new and useful Improvements in Dry Storage Batteries, of which the following is a specification.

This invention relates to secondary or so-called storage batteries and has for its object the provision of a battery rechargeable in the usual meanner but provided with an electrolyte which is a solid mass and which operates to hold the plates against buckling or warping in the event of short circuiting, and which has the additional advantages of entirely enclosing or covering the active portions of the plates so that sulphating will be prevented, the composition of the electrolyte being such that it retains its moisture so that the addition of a spoon full or so of water every few months will be sufficient to keep the battery in proper condition instead of it being necessary to replenish the water supply every ten days or two weeks as is necessary in the ordinary liquid electrolyte storage battery.

Another object is the provision of a battery of this character in which the formation of the electrolyte as a solid mass has the further advantage of eliminating the use of the separators used ordinarily between the plates of storage batteries, my battery structure being such that merely temporary or partial separators in the nature of strips are used for holding the plates in proper spaced relation prior to the pouring in of the plastic electrolyte mass, this feature not only avoiding the expense of the separator plates but also having the result of increasing the capacity of the battery owing to the fact that the electrolyte is in more intimate contact with the plates and is of increased volume.

Another object is the provision of a battery of this character in which the output as well as life is increased for the reason that the solid mass of electrolyte prevents escape of the gas bubbles which form during the first and all subsequent charging of the battery, and also prevents the detachment of the bubbles which adhere to the plates at all times that the battery is charged.

A more specific object is the provision of an electrolyte of certain ingredients mixed or compounded in certain proportions.

With the above and other objects and advantages in view the invention consists in the construction and arrangement of parts and the detailed composition to be hereinafter described and claimed.

Figure 2:
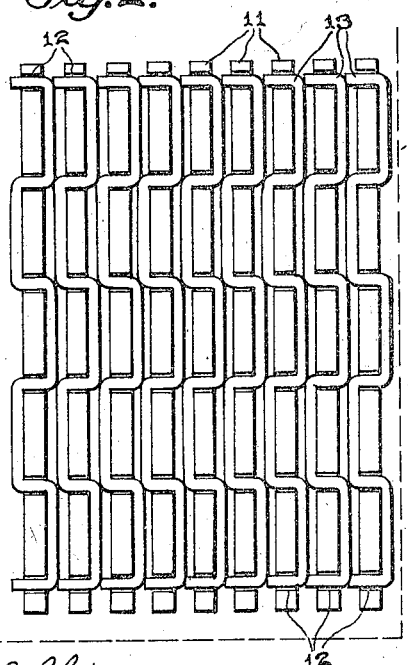
Figure 3:
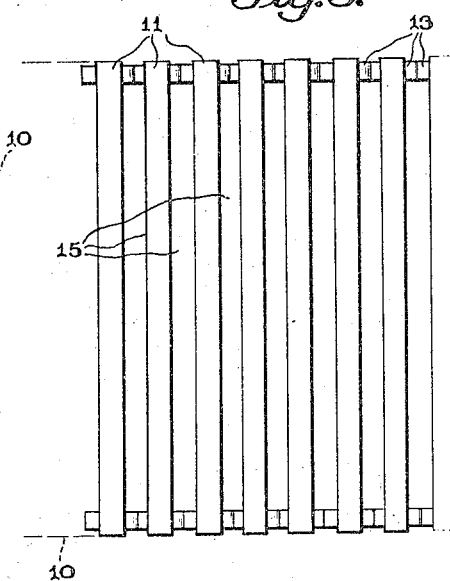

In the drawings:

Figure 1 is a cross sectional view through a battery constructed in accordance with my invention, Figure 2 is an elevation of one group of plates, and Figure 3 is a horizontal section or plan view showing the arrangement of plates and separators.

In constructing a battery in accordance with my invention, use is made of the usual containing box 10 within which are placed as many groups as desired of positive and negative plates 11 which are of ordinary construction which are here shown as having their edges provided with notches 12 for engagement therein of spacing strips 13 which are here illustrated as extending transversely of the plates and laced through slots 14 therein for the purpose of holding the plates in the proper spaced relation prior to the filling in with the electrolyte. The material from which the separators are made is a minor detail as rubber, wood or other suitable material may be employed to equal advantage.

The essential feature consists in the provision of a solid mass of electrolyte indicated at 15 which fills the spaces between the edges of the plates and the box and which also fills the spaces between all of the plates. In making this electrolyte, I make up two solutions, the first of which consists of powdered or ground limestone say 18 ounces by weight, ground silica, 80 to 100 mesh, 8 ounces by weight, mixed with sufficient sulphuric acid solution of 1400 specific gravity to make up to 2 standard gallons, the ingredients being stirred well while mixing. I then add to this solution 9 ounces of 1840 specific gravity sulphuric acid. The other solution consists of, say, 44 ounces of 40 to 41% sodium silicate, 18 ounces of glycerine and sufficient distilled water to make one standard gallon.

After the above two described solutions have been made, I take two parts of the first solution and add thereto one part of the second solution stirring well while mixing. This will produce the electrolyte in the proper consistency for use in my battery the plastic mass being simply poured into the battery box so as to fill all the spaces therein. After a comparatively short length of time the mass will harden and will hold the plates rigidly so that they cannot warp or buckle at any subsequent time even under the most adverse conditions such as in the event of a short circuit from any cause.

In actual practice I have discovered that a battery constructed in this manner has a far greater output capacity than the ordinary battery employing liquid electrolyte and it furthermore has the advantage of remaining moist, owing partly to the provision of the glycerine and also to the sealing properties of the silicate of soda which prevents the escape of the contained moisture, so that it is unnecessary to add water except at intervals of several months, and then only a small quantity. The battery when exhausted is recharged in the same manner as any other storage battery and has another advantage and that is that the spongy lead peroxide is held in position by the solid electrolyte so that none of it is lost when reconverted into the red lead oxide by the recharging action. Also small particles of decomposed lead cannot collect and cause short circuiting as they are held against dropping by the solid electrolyte mass.

While I have shown and described the preferred embodiment of the invention it is of course to be understood that I reserve the right to make such changes in the arrangement of parts and proportions of the ingredients as will not depart from the spirit of the invention or the scope of the subjoined claims.

Having thus described my invention I claim:

1. A dry storage battery electrolyte consisting of a mixture of two solutions, one consisting of powdered lime stone, ground silica and sulphuric acid solution, and the other consisting of sodium silicate, glycerine and distilled water.

2. A dry storage battery electrolyte consisting of a mixture of two solutions, one consisting of powdered lime stone eighteen ounces, ground silica eight ounces, and sufficient sulphuric acid solution to make two gallons, together with a further addition of nine ounces of sulphuric acid solution of higher specific gravity and the other solution consisting of sodium silicate forty-four ounces, glycerine eighteen ounces and sufficient distilled water to make one gallon.

3. A dry storage battery electrolyte consisting of a mixture of two solutions, one consisting of eighteen ounces of powdered limestone, eight ounces of ground silica with sufficient sulphuric acid solution of 1400 S. G. to make two gallons, with a further addition of nine ounces of 1840 S. G. sulphuric acid, and the other solution consisting of forty-four ounces of sodium silicate, eighteen ounces of glycerine and sufficient distilled water to make one gallon.

4. A dry storage battery electrolyte consisting of a mixture of two solutions, one consisting of eighteen ounces of powdered limestone, eight ounces of ground silica with sufficient sulphuric acid solution of 1400 S. G. to make two gallons, with a further addition of nine ounces of 1840 S. G. sulphuric acid, and the other solution consisting of forty-four ounces of sodium silicate, eighteen ounces of glycerine and sufficient distilled water to make one gallon, the electrolyte consisting of two parts of the first named solution and one part of the second named solution.

In testimony whereof I affix my signature.

WILLIAM W. MOORE.